(12) United States Patent
Puliatti et al.

(10) Patent No.: US 8,773,976 B1
(45) Date of Patent: Jul. 8, 2014

(54) METHOD AND SYSTEM FOR COMMUNICATION ACKNOWLEDGEMENT

(75) Inventors: Dante Puliatti, Shawnee, KS (US); Sachin R. Vargantwar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 335 days.

(21) Appl. No.: 13/039,825

(22) Filed: Mar. 3, 2011

(51) Int. Cl.
*H04J 1/16* (2006.01)
*H04J 3/14* (2006.01)
*H04L 12/26* (2006.01)

(52) U.S. Cl.
USPC .......................................................... 370/216

(58) Field of Classification Search
USPC ......... 370/216, 229, 230, 231, 252, 253, 260, 370/352, 328, 389, 394, 473, 474, 458, 370/491; 714/748, 750; 455/522
See application file for complete search history.

(56) References Cited

U.S. PATENT DOCUMENTS

| 7,609,639 | B2 | 10/2009 | Vukovic et al. |
| 7,978,626 | B1* | 7/2011 | Khanka et al. ................. 370/252 |
| 2001/0032325 | A1* | 10/2001 | Fong et al. ...................... 714/18 |
| 2004/0030790 | A1* | 2/2004 | Le et al. ......................... 709/230 |
| 2004/0141525 | A1* | 7/2004 | Bhushan et al. ............... 370/473 |
| 2005/0237994 | A1* | 10/2005 | Fong et al. ..................... 370/349 |
| 2005/0249230 | A1* | 11/2005 | Bennett et al. ................. 370/428 |
| 2007/0168822 | A1 | 7/2007 | Vitebsky et al. |
| 2009/0016265 | A1* | 1/2009 | Katayama et al. ............. 370/328 |
| 2010/0150062 | A1* | 6/2010 | Sjogren et al. ................. 370/328 |
| 2011/0161509 | A1* | 6/2011 | Courtemanche .............. 709/228 |
| 2012/0170445 | A1* | 7/2012 | Perumanam et al. .......... 370/216 |

* cited by examiner

*Primary Examiner* — Abdullah Riyami (57) ABSTRACT

Disclosed is a method and apparatus for helping to reduce latency that may arise from requesting retransmission of non-received packets. A device carrying out the method may be arranged to not send negative acknowledgements for non-received packets. Further, in an implementation where the device is to send for each packet of an incoming sequence either a positive acknowledgement indicating that the device received the packet or a negative acknowledgement indicating that the device did not receive the packet (and constituting a request for retransmission of the packet), the device will send for each packet a positive acknowledgement regardless of whether the device received the packet. The device will thus send a positive acknowledgement for at least one packet even though the device did not receive the packet.

20 Claims, 6 Drawing Sheets

```
┌─────────────────────────────┐
│    DEVICE RECEIVES FROM A   │
│   REMOTE ENTITY A SIGNAL    │
│  COMPRISING A PLURALITY OF  │───40
│    PACKETS IN A SPECIFIED   │
│          SEQUENCE           │
└─────────────────────────────┘

┌─────────────────────────────┐
│    DEVICE TRANSMITS TO THE  │
│  REMOTE ENTITY, RESPECTIVELY│
│   FOR EACH PACKET OF THE    │
│  PLURALITY, AN ACK INDICATING│
│  THAT THE DEVICE RECEIVED THE│──42
│     PACKET, REGARDLESS OF   │
│  WHETHER THE DEVICE ACTUALLY│
│      RECEIVED THE PACKET    │
└─────────────────────────────┘
```

Fig. 3

```
┌─────────────────────────────┐
│   DEVICE RECEIVES A SIGNAL  │
│   COMPRISING A PLURALITY OF │
│   PACKETS IN A SPECIFIED    │
│         SEQUENCE            │──44
└─────────────────────────────┘

┌─────────────────────────────────────┐
│ DEVICE SELECTS A MODE OF OPERATION  │
│ FROM AMONG AT LEAST A FIRST MODE    │
│ AND A SECOND MODE, WHERE THE FIRST  │
│ MODE INVOLVES THE DEVICE            │
│ TRANSMITTING RESPECTIVELY FOR EACH  │
│ PACKET OF THE PLURALITY A POSITIVE  │
│ ACKNOWLEDGEMENT (ACK) IF THE DEVICE │
│ RECEIVES THE PACKET AND A NEGATIVE  │
│ ACKNOWLEDGEMENT (NAK) IF THE DEVICE │
│ DOES NOT RECEIVE THE PACKET, AND    │──46
│ THE SECOND MODE INVOLVES THE DEVICE │
│ TRANSMITTING RESPECTIVELY FOR EACH  │
│ PACKET OF THE PLURALITY AN ACK      │
│ REGARDLESS OF WHETHER THE DEVICE    │
│ RECEIVES THE PACKET, INCLUDING      │
│ TRANSMITTING AN ACK RESPECTIVELY    │
│ FOR AT LEAST ONE PACKET OF THE      │
│ PLURALITY THAT THE DEVICE DOES NOT  │
│ RECEIVE                             │
└─────────────────────────────────────┘

┌─────────────────────────┐
       │  DEVICE OPERATED IN THE │
       │      SELECTED MODE      │──48
       └─────────────────────────┘
```

Fig. 4

```
┌─────────────────────────────┐
│   DEVICE NORMALLY OPERATES  │
│    IN A FIRST MODE IN WHICH THE │
│  DEVICE TRANSMITS RESPECTIVELY │
│     FOR EACH PACKET OF THE  │
│     SEQUENCE A POSITIVE     │
│  ACKNOWLEDGEMENT (ACK) IF THE │──50
│  DEVICE RECEIVES THE PACKET OR │
│  A NEGATIVE ACKNOWLEDGEMENT │
│   (NAK) IF THE DEVICE DOES NOT │
│       RECEIVE THE PACKET    │
└─────────────────────────────┘

┌─────────────────────────────┐
│    DEVICE RUNS A PARTICULAR │
│   COMMUNICATION APPLICATION │──52
└─────────────────────────────┘

┌─────────────────────────────┐
│  RESPONSIVE TO THE DEVICE RUNNING │
│    THE PARTICULAR COMMUNICATION │
│ APPLICATION, THE DEVIE SWITCHES FROM │
│   THE FIRST MODE TO A SECOND MODE IN │
│      WHICH THE DEVICE TRANSMITS │
│    RESPECTIVELY FOR EACH PACKET OF │
│  THE SEQUENCE AN ACK REGARDLESS OF │──54
│    WHETHER THE DEVICE RECEIVES THE │
│    PACKET, INCLUDING TRANSMITTING AN │
│    ACK RESPECTIVELY FOR AT LEAST ONE │
│    PACKET OF THE SEQUENCE THAT THE │
│         DEVICE DOES NOT RECEIVE │
└─────────────────────────────┘
```

METHOD AND SYSTEM FOR COMMUNICATION ACKNOWLEDGEMENT

BACKGROUND

In modern digital communication systems, a data stream that is to be transmitted from one entity to another is typically packetized, and individual packets are transmitted in sequence to the receiving end. At the receiving end, the packets or their underlying data are then assembled in order to regenerate the data stream.

For one reason or another, however, it is possible that one or more of the packets in the transmitted sequence will not arrive successfully at the receiving end. For instance, due to interference or other issues in the communication path, a packet may be lost in transit or its underlying data may be corrupted or modified to the point that the data cannot be recovered by the receiving end.

To help manage such packet loss, a communication system may employ a retransmission scheme in which the receiving end detects the loss of a packet and responsively requests the transmitting end to retransmit the lost packet. For instance, if the packets are sequentially numbered, the receiving end may be configured to detect non-receipt of a particular packet number and to responsively request the transmitting end to retransmit the packet.

Some systems implement this type of retransmission scheme by having the receiving end send a negative acknowledgement (NAK) to the transmitting end for each non-received packet and not send any acknowledgement to the transmitting end for received packets. In this NAK-only implementation, a NAK may identify the non-received packet by packet number, to enable the transmitting end to determine which packet needs to be retransmitted, or a timing scheme could be applied to implicitly correlate a NAK with a particular packet number. In any event, in this implementation, the transmitting end would not take any action to retransmit a packet unless it receives a NAK specifically for that packet.

Other systems implement a retransmission scheme by requiring the receiving end send respectively for each packet of the sequence either a positive acknowledgement (ACK) or a negative acknowledgement (NAK). In such a system, for each packet of the sequence, if the receiving end receives the packet, the receiving end sends an ACK to the transmitting end, and if the receiving end does not receive the packet, the receiving end sends a NAK to the transmitting end. In this implementation, the transmitting end expects to receive either an ACK or a NAK for each packet that it transmits, and absence of both for a given packet may indicate a significant error with respect to the sequence transmission as a whole. Ultimately, this implementation thus provides an extra layer of precaution to help ensure that transmission of the packet sequence is successful.

An example of this latter implementation is the Radio Link Protocol (RLP) packet transmission scheme used in 1xEV-DO cellular communications. There, data that is to be transmitted over an air interface from a cellular base station to cellular wireless client device is divided into a sequence of numbered RLP packets that are transmitted over the air to the cellular wireless client device. Under this protocol, the cellular wireless device is required to transmit over the air to the base station, respectively for each RLP packet of the sequence, either an ACK or a NAK, depending on whether the cellular wireless device successfully receives the packet or not. If the base station receives an ACK for a packet, the base station understands that the packet was successfully received by the cellular wireless device. On the other hand, if the base station receives a NAK for a packet, the base station will retransmit that packet to the cellular wireless device, to allow the cellular wireless device to fully reassemble the data stream.

OVERVIEW

In general, retransmission schemes like those noted above will introduce latency into the data communication process, as the receiving end will typically need to wait for retransmission of a non-received packet before continuing to process the sequence. With RLP, for instance, a common implementation is for the receiving device to receive and buffer a certain number of RLP packets at a time before passing that group of RLP packets to higher layer logic for processing. If the device fails to receive a particular packet of one group and requests retransmission of the packet, the device would then need to wait until it receives the packet before the device can send the group of packets up to the next layer for processing. This latency can pose a particular issue if the data stream being received is for a latency-sensitive application, such as a real-time voice or video communication for instance. Therefore, an improvement is desired.

One way to help minimize this latency is to have the receiving device eliminate or reduce the extent to which it transmits NAKs and thus the extent to which it requests retransmission.

In a NAK-only implementation, this can be accomplished by programming the receiving device to not send a NAK for a packet even though the receiving end does not receive the packet. (Note that this is distinct from merely deferring transmission of a NAK for the packet.) Advantageously, the receiving end would thus not need to wait for retransmission of the packet but could instead continue processing.

In a ACK/NAK implementation such as RLP with 1xEV-DO, however, merely not transmitting a NAK for a non-received packet could pose issues at the transmitting end, since the transmitting end would not receive any ACK or NAK for that packet and may therefore conclude that a problem exists generally with the data transmission. To help avoid this issue in an ACK/NAK implementation, as presently contemplated, the receiving end can instead trick the system by sending an ACK indicating successful receipt of a packet even though the receiving end did not successfully receive the packet. In particular, to help avoid delay resulting from retransmission in an ACK/NAK implementation, the receiving end can be programmed to send an ACK to the transmitting end respectively for each packet of the sequence regardless of whether the receiving end actually receives the packet, so that the receiving end would send an ACK to the transmitting end for at least one packet that the receiving end did not actually receive. From the perspective of the transmitting end, it will thus appear that the receiving end is receiving each packet.

In both of these implementations, having the receiving end not request retransmission of a non-received packet means that the receiving end would not receive the data of that packet. The absence of this data may pose an issue for certain communication applications such as messaging and web browsing, where the data content may be critical to rendering the communication for a user. On the other hand, a missing packet here and there may not pose a significant issue for other communication applications such as real-time voice or video transmissions for instance, since the distortion that results from the missing data may be unnoticeable or fleeting at worst. Considering that such real-time communications are latency-sensitive as noted above, it may therefore be beneficial to have the receiving device reduce or eliminate packet retransmission requests when the device is engaged in such communications.

Accordingly, in practice, a receiving device may be configured to not send NAKs for missed packets, and perhaps to instead send ACKs (falsely indicating successful receipt) for such packets. Further, the receiving device may be configured to operate in this manner when the device is engaged in a latency-sensitive communication such as a real-time voice or video communication for instance.

These as well as other aspects, advantages, and alternatives will become apparent to those of ordinary skill in the art by reading the following detailed description with reference where appropriate to the accompanying drawings.

DETAILED DESCRIPTION

The present method may be usefully applied in any communication system that involves communication of a sequence of packets from one entity to another, where the receiving entity can be expected to send a NAK to the transmitting end to indicate non-receipt of a particular packet (or packets) and to thereby request retransmission of the packet. The method is particularly useful in a system that operates according to the 1xEV-DO (IS-856) air interface protocol with transmission of packets occurring at an RLP layer, and the method will therefore be described primarily in that context. However, it should be understood that other implementations are feasible as well. For instance, the method could be applied at other logical layers in a 1xEV-DO implementation. Further, the method could be applied in the context of other transmission protocols, whether wired or wireless, and now known or later developed.

Figure 1:
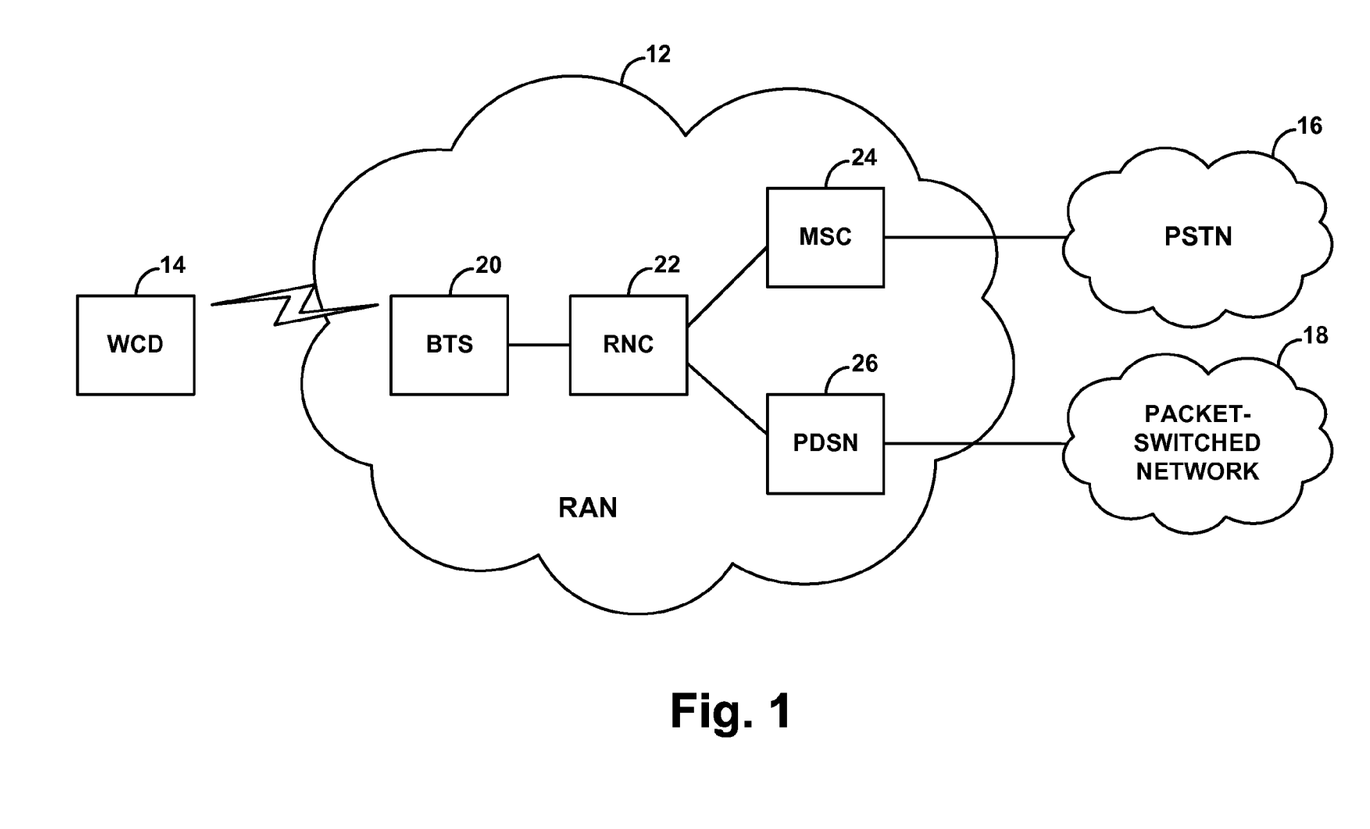
FIG. 1 is a simplified block diagram of a communication system in which the present method can be implemented.

Referring to the drawings, FIG. 1 is a simplified block diagram of an example system in which the method can be implemented. As shown, the system includes at its core a cellular radio access network (RAN) 12 that serves to provide connectivity between served wireless communication devices (WCDs), such as a representative WCD 14, and one or more transport networks such as the public switched telephone network (PSTN) 16 and the Internet 18.

A RAN can take any of a variety of forms. In the arrangement shown, for instance, the RAN includes a base transceiver station (BTS) 20, a radio network controller (RNC) 22, a mobile switching center (MSC) 24, and a packet data serving node (PDSN) 26.

The BTS comprises an antenna structure and associated equipment that enables the BTS to radiate so as to define one or more cellular wireless coverage areas such as a cell and cell sectors in which served WCDs can communicate with the BTS. Radio Frequency (RF) communication over the air between the BTS and served WCDs can occur according to an agreed air interface protocol, examples of which include CDMA, CDMA 1xEV-DO, WiMAX, LTE, IDEN, GSM, WIFI, HSDPA, and others now known or later developed.

The BTS is then coupled with the RNC, which controls BTS and various aspects of air interface communication, such as handoff between BTSs for instance. In turn, the RNC is coupled with the MSC, which provides connectivity with the PSTN, and with the PDSN, which provides connectivity with a packet-switched network such as the Internet.

In a system like this, a WCD that is arranged to be able to engage in legacy voice calls on the PSTN can initiate such a call by transmitting on an air interface access channel to the BTS an origination request providing a service option code that the RAN would interpret as a request to initiate a circuit-switched voice call to a particular number. That request may then pass to the MSC, which may set up the call over the PSTN, and BTS may assign an air interface traffic channel over which the WCD may engage in the call. The call may then proceed, with the WCD and BTS communicating with each other according to agreed air interface protocol, and the RAN connecting the call with the PSTN.

Likewise, a WCD that is arranged to be able to engage in wireless packet data communication may acquire wireless packet data connectivity with the RAN by transmitting to the BTS an origination request providing a service option code that the RAN would interpret as a request to establish packet data connectivity. In response to such a request, the BTS may assign an air interface traffic channel to the WCD and the WCD may communicate with the PDSN to establish a data link layer connection and to obtain an Internet Protocol (IP) address for communicating on the packet-switched network. The WCD may then engage in packet-data communication with the BTS according to an agreed air interface protocol and may use the assigned IP address for communicating with entities on the packet-switched network.

Traditional CDMA voice calls are circuit-switched calls. As such, there is generally no retransmission of voice packets (e.g., frames or the like), as any such retransmission would give rise to latency that would be undesirable for voice communication.

Packet-data communications, however, typically involve some extent of retransmission. This is particularly the case for any missed RLP packets under the 1xEV-DO air interface protocol.

Figure 2:
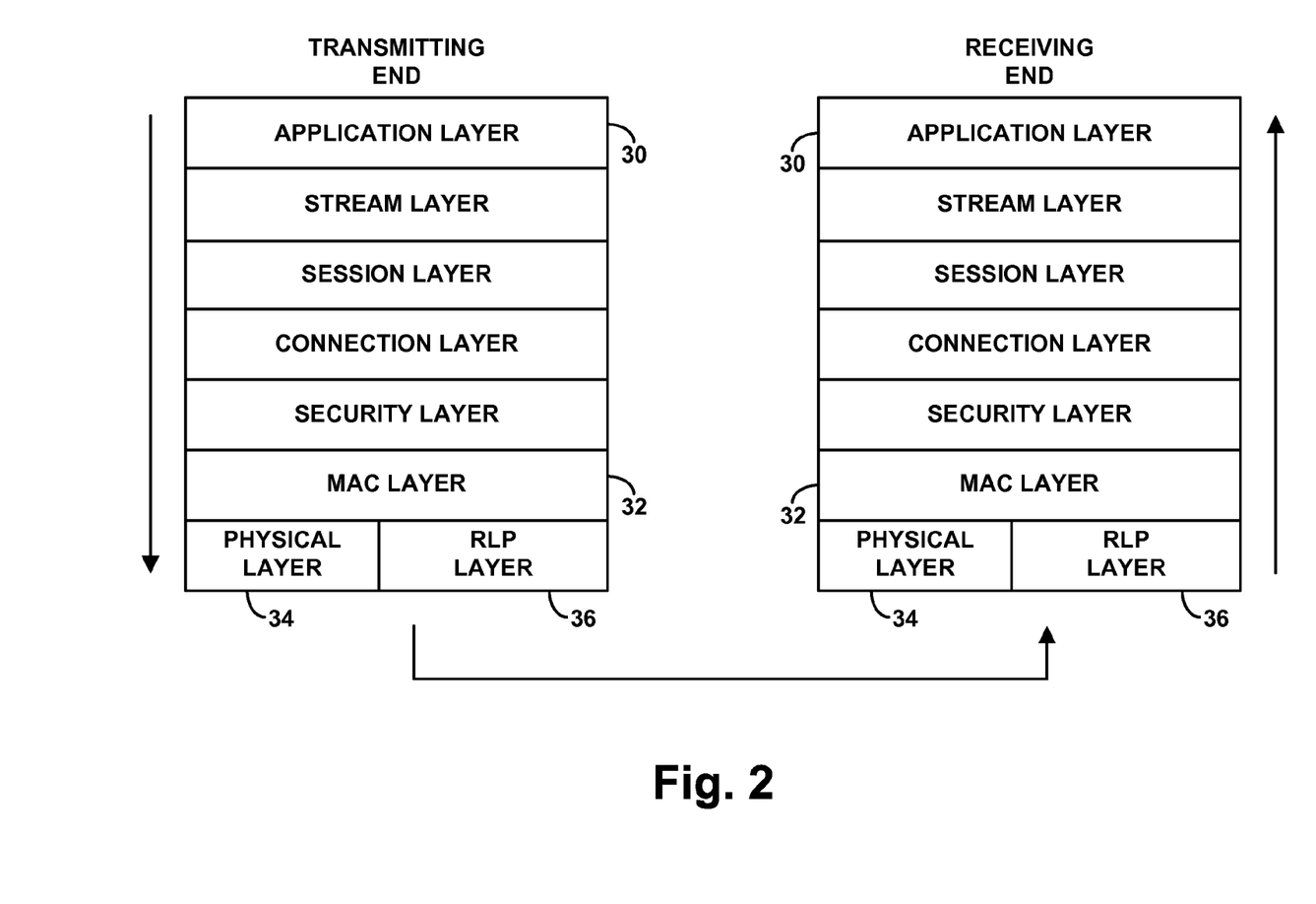
FIG. 2 is an illustration of logical layers in an example 1xEV-DO system.

As context for an understanding of this process, FIG. 2 depicts a representative protocol stack in a 1xEV-DO communication system. This stack defines the logical layers of processing to facilitate communication of content from one endpoint to another in the system. In general, at the transmitting end, processing occurs from the top down through the stack, with various coding, packetizing, and other manipulation occurring along the way. At the receiving end, processing then occurs from the bottom up through the stack, with decoding, depacketizing, and other reverse manipulation occurring along the way, to obtain the transmitted content.

As shown, at the top of the stack is an application layer 30, defining communication applications, which may include applications that are not particularly latency sensitive, such as messaging and web browsing applications, and applications that are latency sensitive such as voice-over-IP applications (e.g., push-to-talk applications). Near the bottom is then a Media Access Control (MAC) layer 32 and then a physical layer 34 including an RLP layer 36.

In a 1xEV-DO system, at least the MAC and physical layers specifically relate to air interface communication of data from the RAN to the WCD. In particular, at the RAN (e.g., in the BTS or RNC), data that is to be transmitted to the WCD is broken into a sequence of RLP packets (also sometimes referred to as frames or subframes, or by other names), each sequentially numbered to define its order in the sequence, and the RLP packets are transmitted over the air from the BTS to the WCD. As the WCD receives RLP packets, the WCD buffers packets until the WCD receives a defined threshold number of sequential packets, at which point the WCD bundles or concatenates those packets together and passes the result up the stack to the MAC layer for processing. Processing then continues in turn up the stack at the WCD, with additional processing occurring at each layer if applicable, and the underlying content ultimately arrives at the application layer for handling by an application, such as for playout or presentation to a user of the WCD for example.

Under 1xEV-DO, the WCD and the RAN are configured to apply an acknowledgement process according to which the WCD transmits over the air to the RAN, respectively for each RLP packet in the sequence, either an ACK or a NAK. Thus, for each RLP packet, if the WCD receives the packet, the WCD transmits an ACK, which is understood at the RAN as an indication that the WCD received the packet, whereas, if the WCD does not receive the packet, the WCD transmits a NAK, which functions as a request for the RAN to retransmit the packet. In this 1xEV-DO implementation, the RAN thus expects to receive either an ACK or a NAK respectively for each RLP packet that it transmits to the WCD, and if the RAN receives a NAK for a given packet, the RAN would retransmit that packet to the WCD.

This ACK/NAK process applies generally in a 1xEV-DO implementation and may apply analogously under other air interface protocols and at other layers of communication. As noted above, however, the process of requesting retransmission of non-received packets can cause latency issues.

Under 1xEV-DO, for instance, if a WCD does not receive a particular RLP packet (e.g., the packet does not arrive at all, or the packet arrives corrupted and is thus not usable), the WCD would send a NAK as a retransmission request, and the WCD would then need to wait to receive the retransmitted packet. This would likely delay the process of the WCD sending the group of packets, of which the non-received packet was a part, up to the MAC layer, and would thus delay the overall process of passing the incoming data stream up to the application layer.

For example, assume that the WCD is set to bundle every four received RLP packets and to pass those packets or their data as a group up to the MAC layer. As the WCD receives packet number 1 and then packet number 2, the WCD would send an ACK to the RAN for each of those packets. However, if the WCD then receives packet number 4, the WCD may conclude that packet number 3 did not arrive. Consequently, in addition to sending an ACK for packet number 4, the WCD would send a NAK for packet number 3, requesting retransmission of packet number 3. The WCD would then need to wait to receive the retransmitted packet number 3 before being able to send the group {1, 2, 3, 4} up to the MAC layer for processing.

As noted above, the latency that results from requesting retransmission like this may not be a particular issue for pure data traffic, such as various messaging and web browsing traffic for instance. However, if the data traffic that is being communicated is voice, video, or other real-time media, the latency may be a particular problem, as enough latency may noticeably affect the presentation or other use of the real-time media.

The present method helps to mitigate this problem in this or analogous scenarios, by having the WCD avoid sending a NAK for one or more packets that the WCD does not receive, and particularly in an ACK/NAK implementation (such as 1xEV-DO) to send an ACK instead, thus falsely indicating to the RAN that the WCD received the packet when in fact the WCD did not receive the packet.

Furthermore, to help apply this method when most useful, the method can be triggered by the WCD engaging in a particular communication application, such as a latency-sensitive application like VoIP for instance. To facilitate this, the WCD may be programmed to dynamically switch between a first mode of operation in which the WCD sends an ACK or NAK respectively for each packet, and a second mode of operation in which the WCD sends an ACK for each packet regardless of whether the WCD receives the packet. The WCD may then be programmed to detect when the WCD is running a particular communication application, such as when the WCD is running an application that is deemed to be a latency-sensitive application, or when the WCD is running an particular designated application, such as PTT or another VoIP application for instance, and to responsively switch to the second mode of operation. Thus, in this example implementation, when the WCD is not running such a latency-sensitive or other designated application, the WCD would apply a standard ACK/NAK process for each expected packet, whereas when the WCD is running such an application, the WCD would apply an ACK-only process including transmitting an ACK for at least one packet that the WCD did not actually receive.

The device may include logic, such as operating system logic, that detects when the device is running a particular application and that consults reference data in the device to determine if the application is one that should trigger the device operating in an ACK-only mode as presently contemplated. The logic may then set a flag or otherwise apply a setting used by the device at the applicable layer (e.g., RLP layer) to operate in that mode. Alternatively, an application itself may be configured to set such a flag or otherwise apply such a setting in the device. Ultimately, this can be viewed as a logical communication between the application layer and the packet receipt layer (e.g., RLP layer) to facilitate transition to the ACK-only mode.

A result of this method will be that the WCD would need to deal with its non-receipt of a packet, which may impact how the WCD passes data up to the next layer (e.g., MAC layer) for processing. One way for the WCD to deal with this is for the WCD to discard the group of packets of which the non-received packet was a part, and to thus altogether avoid passing that group up to the next layer for processing. Another way for the WCD to deal with this is for the WCD to pad the group with data (e.g., all zeros) in place of the non-received packet. Higher layer processing may then take further action if necessary to manage the missing or erroneous data. However, for a latency-sensitive communication application, the missing or erroneous data may pose little if any issue.

Figure 3:
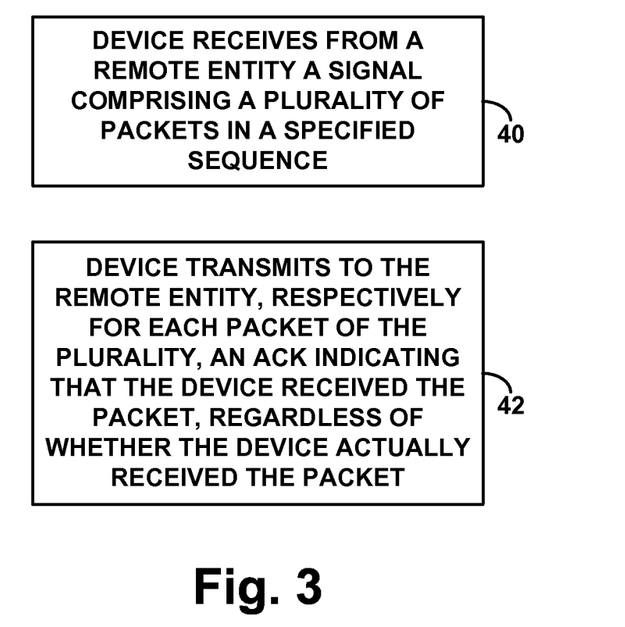
FIG. 3 is a depiction of functions that can be implemented in accordance with the present method.

FIG. 3 is a depiction of some of the functions that can be carried out for a device (such as the representative WCD for instance) in accordance with this method. Such a device may be operating under a protocol (e.g., 1xEV-DO) according to which the device is to send either an ACK or a NAK to the remote entity respectively for each packet (e.g., RLP packet) that it expects to receive. Various functions shown in FIG. 3 may be carried out in parallel or in a particular order.

As shown in FIG. 3, at block 40, the method involves the device receiving from a remote entity a signal (e.g., a digital bit stream or other communication) comprising a plurality of packets in a specified sequence. The act of receiving the signal does not mean that the device necessarily receives each packet of the signal. Indeed, the method is particularly useful in a scenario where the device does not receive one or more of the packets of the signal.

At block 42, the method further involves the device transmitting to the remote entity, respectively for each packet of the plurality, an ACK indicating that the device received the packet, regardless of whether the device actually received the packet. This means that, for at least one packet of the plurality that the WCD did not receive, the WCD would send an ACK to the remote entity. In a scenario where the remote entity interprets the ACK as an indication that the WCD received the packet, transmission of the ACK for a packet that the WCD did not actually receive would thus falsely indicate to the remote entity that the WCD received the packet. Advantageously, this will help avoid packet retransmission and its associated latency, while complying with the protocol by sending an ACK (rather than no ACK or NAK) for the packet.

Figure 4:
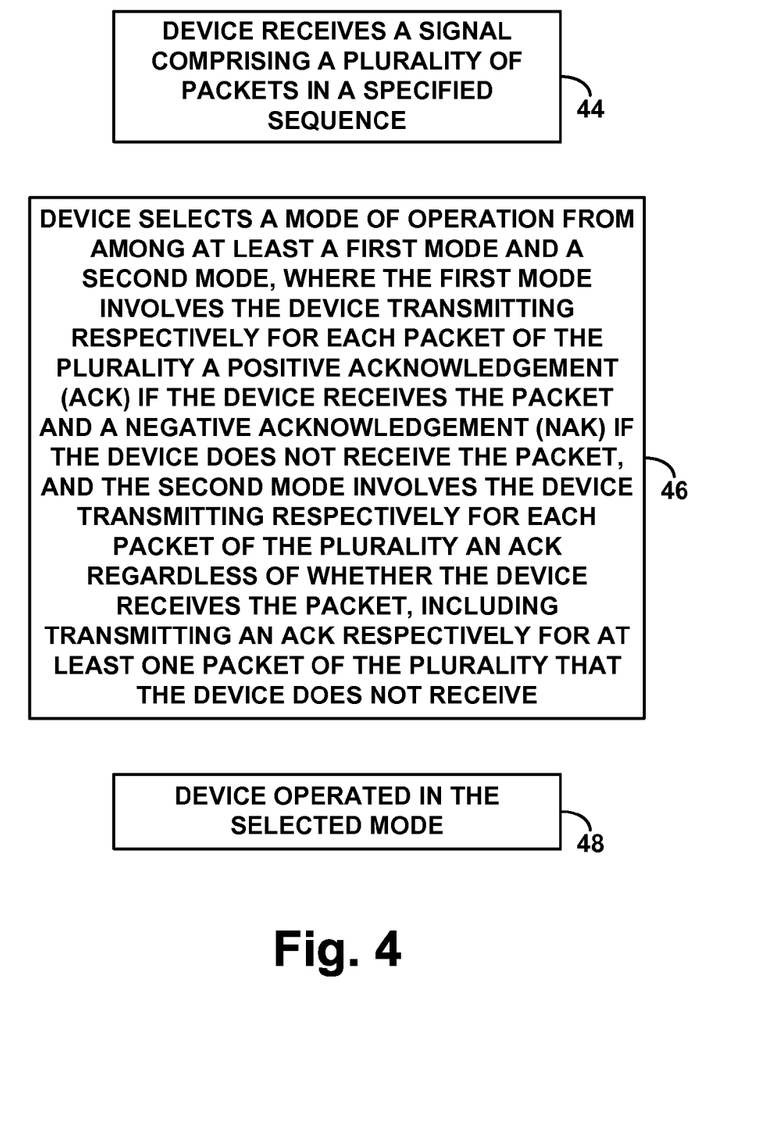
FIG. 4 is another depiction of functions that can be implemented in accordance with the present method.

FIG. 4 is next another depiction of some of the functions that can be carried out for such a device in accordance with the method. As with FIG. 3, various functions shown in FIG. 4 may be carried out in parallel or in a particular order.

As shown in FIG. 4, at block 44, the method involves the device receiving a signal comprising a plurality of packets in a specified sequence. At block 46, the method further involves the device selecting a mode of operation from among at least a first mode and a second mode. What this means is that the device is configured with logic to operate in each mode, and the device is configured to select a given one of the modes in which to operate. At block 48, the method further involves operating in the selected mode.

In this method, when the device is in the first mode, the device is configured to transmit respectively for each packet of the plurality a positive acknowledgement (ACK) if the device receives the packet and a negative acknowledgement (NAK) if the device does not receive the packet. On the other hand, when the device is in the second mode, the device is configured to transmit respectively for each packet of the plurality an ACK regardless of whether the device receives the packet, including transmitting an ACK respectively for at least one packet of the plurality that the device does not receive.

As noted above, the device at issue may be running a communication application. In that case, the act of selecting the mode of operation from among the first mode and the second mode may comprise the device selecting the mode of operation based on the communication application, such as detecting that the application is running or that the application is a particular type of application (e.g., latency-sensitive) or a particular application (e.g., VoIP) and responsively selecting the second mode, or the application itself causing the device to select the second mode.

Figure 5:
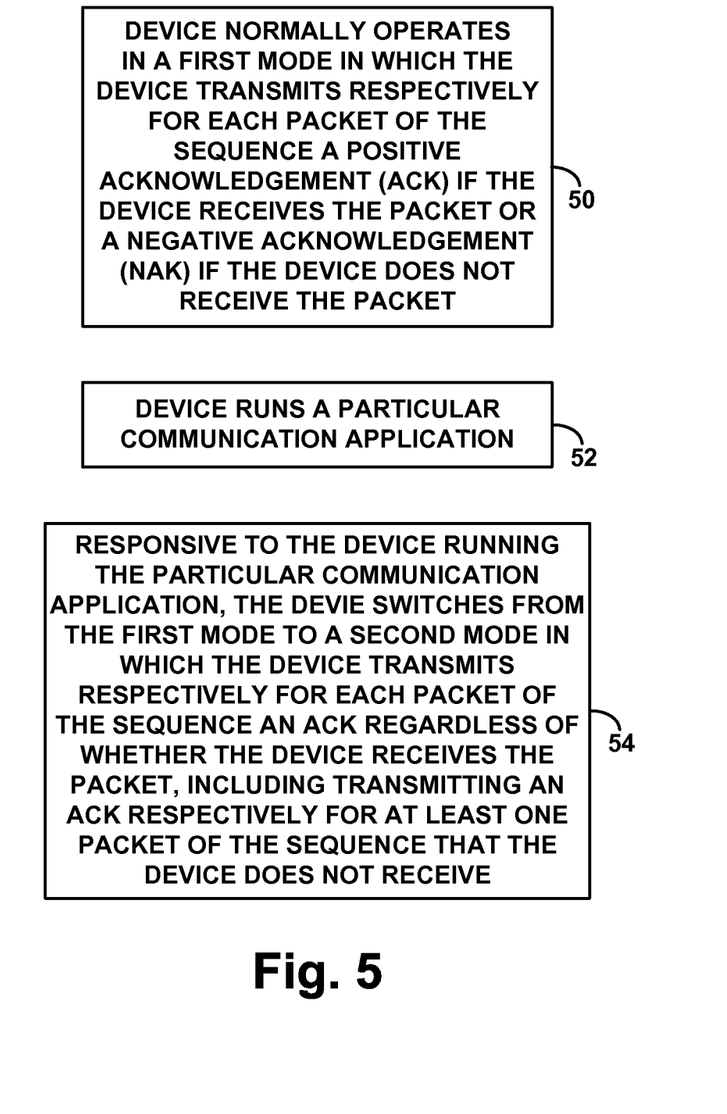
FIG. 5 is another depiction of functions that can be implemented in accordance with the present method.

FIG. 5 is next another depiction of functions operable in a device that is configured such that when the device receives a sequence of packets the device sends an acknowledgement respectively for each packet of the sequence. As with the other function diagrams, the functions of FIG. 5 may be carried out in parallel or in a particular order.

As shown in FIG. 5, at block 50, the device normally operates in a first mode in which the device transmits respectively for each packet of the sequence a positive acknowledgement (ACK) if the device receives the packet or a negative acknowledgement (NAK) if the device does not receive the packet.

At block 52, the device runs a particular communication application, such as beginning to run the application or detecting that it is running the application.

At block 54, responsive to the device running the particular communication application, the device switches from the first mode to a second mode in which the device transmits respectively for each packet of the sequence an ACK regardless of whether the device receives the packet, including transmitting an ACK respectively for at least one packet of the sequence that the device does not receive.

Figure 6:
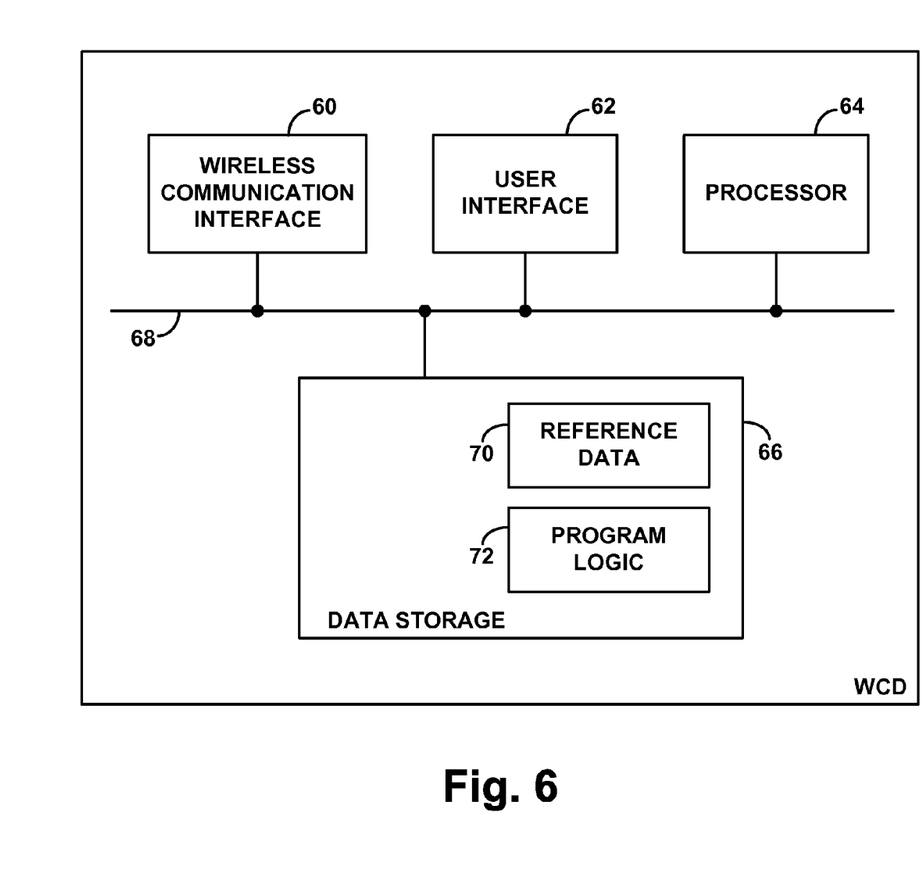
FIG. 6 is a simplified block diagram depicting functional components of a wireless communication device arranged to carry out the present method.

FIG. 6 is next a simplified block diagram of an example WCD arranged to operate in accordance with the present method. The WCD may be a cell phone or other wirelessly equipped communication device. As shown, the WCD includes an wireless communication interface 60, a user interface 62, a processor 64, and non-transitory data storage 66, all of which may be communicatively linked together by a system bus, network, or other connection mechanism 68.

Wireless communication interface 60 preferably comprises a wireless chipset, such as a Qualcomm MSM chipset for instance, and an associated antenna arrangement, arranged to engage air interface communication with the RAN according to an agreed air interface protocol. This interface 60 may various lower layer logic of the 1xEV-DO protocol stack shown in FIG. 2 for instance, including RLP layer functionality example. This interface may provide a pin-out connection or other link to facilitate communication with other components of the WCD, such as to receive a command to put the RLP layer into a mode in which it transmits ACKs even for non-received packets.

User interface 62 functions to facilitate interaction with a user of the WCD if applicable. As such, the user interface may include input components such as a microphone and associated analog-to-digital converter, a touch-sensitive screen, a video camera, and a keypad, and output components such as a sound speaker and associated digital-to-analog converter, and a display screen.

Processor 64 may comprise one or more general purpose processors or processing units and/or one or more special purpose processors such as application specific integrated circuits or digital signal processors, and processor 64 may be integrated in whole or in part with communication interface 60.

Data storage 66 may in turn comprise one or more volatile and/or non-volatile storage components, such as optical, magnetic, or flash storage, whether removable or not, and may be integrated in whole or in part with processor 64. As shown, data storage 66 includes reference data 70 and program logic 72.

Reference data 70 may comprise a table listing applications, individually or by class, that are to be subject to the present method, along with other data usable by program logic 72. Program logic 72 in turn comprises machine language instructions or other instructions executable by processor 64 to define various application and to carry out various functions described herein. Further, various functions of the present method may be carried out by firmware or hardware, such as circuitry or logic that is part of wireless communication interface 60.

In practice, application-layer logic on the WCD may be executable by the processor to run particular applications, such as a VoIP application for instance, and, if the WCD runs an application that is to be subject to the present method of reducing latency, to signal to wireless communication interface 60. Wireless communication interface 60 may then responsively set a flag to be put in a mode of operation where it sends an ACK to the RAN respectively for each packet of an incoming sequence regardless of whether the wireless communication interface 60 receives the packet.

Thus, per the discussion above, the WCD is preferably configured to receive a plurality of packets via the interface from the RAN and to transmit via the interface to the RAN, respectively for each packet of the plurality, an acknowledgement. Further, the device has a first mode of operation in which the device transmits a positive acknowledgement (ACK) respectively for each packet of the plurality that the device receives and the device transmits a negative acknowledgement (NAK) respectively for each packet of the plurality that the device expects to receive but does not receive. And the device has a second mode of operation in which the device transmits an ACK respectively for each packet of the plurality regardless of whether the device receives the packet, including transmitting an ACK respectively for at least one packet of the plurality that the device does not receive. In accordance with an implementation of the method, the device is then configured to select between the first mode and second mode based on a communication application being executed by the device.

An exemplary embodiment of the present invention has been described above. Those skilled in the art will appreciate, however, that many variations from the embodiment are possible while remaining within the spirit and scope of the claims.

We claim:

1. A method for a device, the method comprising:
the device receiving from a remote entity a signal comprising a plurality of packets in a specified sequence, wherein the device is operating under a protocol according to which the device is to send to a remote entity, respectively for each packet of the plurality, a positive acknowledgement (ACK) if the device receives the packet but a negative acknowledgement (NAK) if the device does not receive the packet;
the device transmitting to the remote entity, respectively for each packet of the plurality, an ACK indicating that the device received the packet, regardless of whether the device actually received the packet, including transmitting to the remote entity an ACK respectively for at least one packet of the plurality that the device did not receive, whereby transmitting the ACK respectively for each packet helps avoid packet retransmission, while complying with the protocol; and
the device replacing the at least one non-received packet with padding for processing by the device.

2. The method of claim 1, wherein the packets are Radio Link Protocol (RLP) layer packets.

3. A method for a device, the method comprising:
the device receiving a signal comprising a plurality of packets in a specified sequence; and
the device selecting a mode of operation from among at least a first mode and a second mode,
wherein in the first mode the device is configured to transmit respectively for each packet of the plurality a positive acknowledgement (ACK) if the device receives the packet and a negative acknowledgement (NAK) if the device does not receive the packet, and
wherein in the second mode the device is configured to transmit respectively for each packet of the plurality an ACK regardless of whether the device receives the packet, including transmitting an ACK respectively for at least one packet of the plurality that the device does not receive, wherein the device replaces the at least one non-received packet with padding for processing by the device.

4. The method of claim 3, further comprising the device operating in the selected mode.

5. The method of claim 3, wherein the device is running a communication application, and wherein selecting the mode of operation from among the first mode and the second mode comprises selecting the mode of operation based on the communication application.

6. The method of claim 5, wherein the communication application is a voice-over-Internet-Protocol (VoIP) application, and wherein selecting the mode comprises selecting the second mode.

7. The method of claim 6, wherein the device is a wireless communication device, and wherein receiving the signal comprising the plurality of packets comprises receiving the signal at a Radio Link Protocol (RLP) layer from a radio access network, wherein the packets are RLP packets.

8. The method of claim 7, wherein the device operates under an air interface protocol according to which the device is to transmit an acknowledgement, whether positive or negative, for each packet of the sequence.

9. A method operable in a device, wherein the device is configured such that when the device is receiving a sequence of packets, the device sends an acknowledgement respectively for each packet of the sequence, the method comprising:
the device normally operating in a first mode in which the device transmits respectively for each packet of the sequence a positive acknowledgement (ACK) if the device receives the packet or a negative acknowledgement (NAK) if the device does not receive the packet;
the device running a particular communication application; and
responsive to the device running the particular communication application, the device switching from operating in the first mode to operating in a second mode in which the device transmits respectively for each packet of the sequence an ACK regardless of whether the device receives the packet, including transmitting an ACK respectively for at least one packet of the sequence that the device does not receive, wherein the device replaces the at least one non-received packet with padding for processing by the device.

10. The method of claim 9, wherein the device is a wireless communication device, and wherein the sequence of packets is a sequence of Radio Link Protocol (RLP) packets.

11. The method of claim 10, wherein switching from the first mode to the second mode comprises switching from the first mode to the second mode in response to the communication application being a latency-sensitive application.

12. The method of claim 10, wherein switching from the first mode to the second mode comprises switching from the first mode to the second mode in response to the communication application being a voice-over-Internet-Protocol (VoIP) application.

13. The method of claim 10, wherein the communication application is a voice-over-Internet-protocol (VoIP) application.

14. The method of claim 9, further comprising the device operating under an air interface protocol according to which the device is to transmit an acknowledgement, whether positive or negative, for each packet of the sequence.

15. A wireless communication device comprising
an interface for communicating wirelessly with a radio access network (RAN),
the device being configured to receive a plurality of packets via the interface from the RAN and to transmit via the interface to the RAN, respectively for each packet of the plurality, an acknowledgement, the device having a first mode of operation in which the device transmits a positive acknowledgement (ACK) respectively for each packet of the plurality that the device receives and the device transmits a negative acknowledgement (NAK) respectively for each packet of the plurality that the device expects to receive but does not receive, the device having a second mode of operation in which the device transmits an ACK respectively for each packet of the plurality regardless of whether the device receives the packet, including transmitting an ACK respectively for at least one packet of the plurality that the device does not receive, wherein the device replaces the at least one non-received packet with padding for processing by the device; and the device being configured to select between the first mode and second mode based on a communication application being executed by the device.

16. The device of claim 15, wherein the plurality of packets are Radio Link Protocol (RLP) packets.

17. The device of claim 16, wherein the RLP packets carry data destined to the communication application, and wherein selecting between the first mode and second mode based on the communication application comprises selecting the second mode in response to the communication application being a latency-sensitive application.

18. The device of claim 16, wherein the RLP packets carry data destined to the communication application, wherein the communication application is a voice-over-Internet-Protocol (VoIP) application, and wherein selecting between the first mode and second mode based on the communication application comprises selecting the second mode in response to the communication application being the VoIP application.

19. The device of claim 15, operating under an air interface protocol according to which the device is to transmit an acknowledgement, whether positive or negative, for each packet of the plurality.

20. The device of claim 15, further comprising:
an application layer at which the communication application is executed, and a Radio Link Protocol (RLP) layer at which the packet receipt and acknowledgement transmission occurs,
wherein the application layer communicates to the RLP layer to provide for operation in the selected mode.

* * * * *